United States Patent
Jordil et al.

(10) Patent No.: US 9,797,706 B2
(45) Date of Patent: Oct. 24, 2017

(54) COORDINATE MEASURING MACHINE

(71) Applicant: HEXAGON TECHNOLOGY CENTER GMBH, Heerbrugg (CH)

(72) Inventors: Pascal Jordil, Ecoteaux (CH); Johan Stigwall, St. Gallen (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 100 days.

(21) Appl. No.: 15/014,371

(22) Filed: Feb. 3, 2016

(65) Prior Publication Data

US 2016/0223316 A1 Aug. 4, 2016

(30) Foreign Application Priority Data

Feb. 4, 2015 (EP) ..................................... 15153841

(51) Int. Cl.
*G01B 11/00* (2006.01)
*G01B 21/04* (2006.01)

(52) U.S. Cl.
CPC .......... *G01B 11/005* (2013.01); *G01B 21/047* (2013.01)

(58) Field of Classification Search
CPC .. G01B 11/002; G01B 11/2513; G01B 5/004; G01B 11/2531; G01B 21/045; G01B 11/005
USPC .................................................... 33/503, 542
See application file for complete search history.

(56) References Cited

U.S. PATENT DOCUMENTS

| 8,892,252 B1 | 11/2014 | Troy et al. |
| 8,938,886 B2* | 1/2015 | Ross ...................... B21D 31/04 33/542 |
| 2015/0049186 A1* | 2/2015 | Pettersson ............ G01B 21/047 348/135 |
| 2015/0266183 A1* | 9/2015 | Alifragkis .............. B25J 9/1692 700/254 |

(Continued)

FOREIGN PATENT DOCUMENTS

| EP | 1 650 530 A1 | 4/2006 |
| EP | 2283311 A1 | 2/2011 |

(Continued)

OTHER PUBLICATIONS

Extended European Search Report dated Jul. 23, 2015 as received in Application No. 15153841.0.

(Continued)

*Primary Examiner* — Yaritza Guadalupe-McCall
(74) *Attorney, Agent, or Firm* — Maschoff Brennan (57) ABSTRACT

Some embodiments of the present invention relate to a coordinate measuring machine CMM, comprising a carrier as a support and positioning structure for an end-effector as a target, the end-effector being movable in at least three degrees of freedom and positionable by the carrier, a stationary metrology table as a support for a possible target object, and a control unit controlling the moving of the end-effector by the carrier. The CMM further comprises at least one, in particular at least two, imaging detectors for measuring and determining in six degrees of freedom a position of the possible target object, and an analysing unit for processing electronic signals and/or data delivered by the imaging detectors. According to the invention, the imaging detectors are firmly mounted to the metrology table, mechanically de-coupled from the carrier.

25 Claims, 4 Drawing Sheets

(56) References Cited

U.S. PATENT DOCUMENTS

| | | | | |
|---|---|---|---|---|
| 2015/0285616 A1* | 10/2015 | Jordil | ............... | G01B 21/047 33/503 |
| 2015/0300798 A1* | 10/2015 | Pettersson | ............ | G01B 21/04 33/503 |
| 2016/0191911 A1* | 6/2016 | Filhaber | ............ | G01B 21/042 348/95 |
| 2016/0223316 A1* | 8/2016 | Jordil | ............... | G01B 11/005 |
| 2016/0313114 A1* | 10/2016 | Tohme | ............ | G01B 11/005 |
| 2016/0327383 A1* | 11/2016 | Becker | ............ | G01B 11/005 |

FOREIGN PATENT DOCUMENTS

| | | |
|---|---|---|
| EP | 2 705 935 A1 | 3/2014 |
| WO | 2008/135530 A1 | 11/2008 |
| WO | 2013/083730 A1 | 6/2013 |
| WO | 2014/128299 A1 | 8/2014 |

OTHER PUBLICATIONS

"Data sheet—Equator™ 300 gauging system—SP25/MODUS" Renishaw plc., Aug. 2013.

* cited by examiner

COORDINATE MEASURING MACHINE

FIELD

The present invention relates to a coordinate measuring machine (short "CMM"), comprising a carrier as a support and positioning structure for an end-effector as a target, the end-effector being movable in at least three, particularly in up to six, degrees of freedom and positionable by the carrier; a stationary metrology table as a support for a possible target object; and a control unit controlling the moving of the end-effector by the carrier. The CMM further comprises at least two, in particular at least three, imaging detectors for measuring and determining in six degrees of freedom a position of the possible target object, and an analysing unit for processing electronic signals and/or data delivered by the imaging detectors.

BACKGROUND

It is common practice to inspect work pieces subsequent to production on a coordinate positioning apparatus, such as a CMM, in order to check for correctness of predefined object parameters, like dimensions and shape of the object.

In a conventional 3-D coordinate measurement machine, a probe head is supported for movement along three mutually perpendicular axes (in directions X, Y and Z). Thereby, the probe head can be guided to any arbitrary point in space of a measuring volume of the CMM, and the object is measurable with a measurement sensor (probe) carried by the probe head.

In a simple form of the machine, a suitable transducer mounted parallel to each axis is able to determine the position of the probe head relative to a base of the machine and, therefore, to determine the coordinates of a measurement point on the object being approached by the sensor. For providing movability of the probe head, a typical coordinate measuring machine may comprise a frame structure on which the probe head is arranged and driving means for moving frame components of the frame structure relative to each other.

Usually a CMM has a tactile probe or an optical probe for gauging the surface of a target object. The optical or tactile probe is movably fixed at an articulated arm, as it is shown for a tactile probe i.e. in EP 2283311 A1, or at a portal, as it is shown for an optical probe i.e. in WO 2008/135530 A1, so that it can be moved over the surface of the target object.

For measuring surface variations, both measurement principles based on use of tactile sensors and of optical sensors are known.

In general, for providing a coordinate measuring machine with high measurement precision, its frame structure is therefore usually designed to have a high static stiffness. In order to achieve a stiff and rigid machine design, the frame structure or at least parts of it, is often made of stone, such as granite. Besides all the positive effects like high thermal stability and good damping properties, the granite or other stiff materials also make the machine and the movable frame elements quite heavy. The high weight on the other side also requires high forces for a decent acceleration.

Adequate calibrations can make such an approach working quite well, but all non-repetitive imperfections of the mechanics fully impact the resulting accuracy. So, for example, if there is some play between a first axis and a second one, none of the linear scales or angle encoders applied for determining the position of the sensor would enable to recognise such a play.

As a further important aspect, weight reduction is a main topic relating to the designs of novel coordinate measuring machines. If the machine components are built comprising less weight (associated with less stiffness), faster positioning of respective components can be achieved, simultaneously with causing fewer force affecting the coordinate measuring machine. On the other hand, the influence of machine vibrations and torsions caused by reduced stiffness and (faster) movement of the machine components increases along with weight reduction of these parts. Thus, uncertainties of derived measurement values and errors occurring from such deformations and vibrations increase accordingly.

Therefore, especially with regard to weight reduction but also for conventional machines, an accurate error handling is an important aspect.

In industry, measurement times are considered as unproductive times as no salable components are produced during this period. The measurement task therefore has to be done as quickly as possible. Thus, high measurement speed and short preparation times, including a quick fixation of the object to be gauged and a short calibration time for the CMM, is of high commercial importance. In this context, it is understandable that not only the maximum. moving speed of the measurement probe relative to the target object is of interest, which mainly important for large components and long distances to be traveled by the measurement probe, but also a maximum acceleration and deceleration, which important for small work pieces as the latter allows a very fast positioning of the measurement probe on the interesting positions relative to the target object.

Therefore, several measures have been taken during the past in order to increase the measurement speed. E.g., measuring with an optical probe instead of a tactile probe in general can increase the measurement rate and avoid abrasion effects at the surface of the target object.

Another option to increase measurement rate is the use of a camera as a measurement probe and using this camera in an "on the fly"-mode, as it is described in WO 2008/135530 A1. During the "on the fly"-measurement mode, the camera is moved continuously over the target object and takes pictures only at the interesting positions without stopping there. The position data for each image is delivered from position encoders and stored together with the according image. A flash light illumination of the interesting positions ensures a sharp picture in spite of the moving speed of the camera. As the camera is not stopped at the interesting positions, less deceleration and acceleration actions have to be carried out which decreases measuring time and avoids triggering vibrations in the structure. However, in order to know the interesting positions and in order to move the camera along optimized trajectories including all interesting positions, calibration of the CMM, usually on the basis of a reference object, is necessary and a subsequent programming of the trajectories including the defined interesting positions, where pictures should be undertaken.

However, using a normal, cost-efficient camera with a standard sized optics shows a small field of view, when used with a magnification adequate to reach the necessary accuracy. As the field of view is small, it is necessary to take a lot of images, which means a lot of movements of the camera in order to see all features of interest. Thus, the throughput of a commercial CMM with an articulated arm or a portal structure—independent of using it with or without an "on the fly"-mode—is still non-satisfying, caused by its low speed and low acceleration. In order to counter this unsatisfying situation, nowadays many CMMs are offered with cameras provided with objectives of larger diameter, showing a larger field of view for the same magnification. As a result, no movements are necessary to measure small target objects and only a few movements and a few images are necessary for encompassing a large target object. However, those CMMs are expensive, as the price for cameras with an accordingly large objective is high.

The latest development tries to increase the measurement rate by using a so called "Delta robot" instead of a portal machine or an articulated arm for moving a tactile measurement probe (see the brochure "Equator 300 Mess-Systeme" of Renishaw, published in July 2011).

A Delta robot is a kind of parallel robot. It comprises a stationary base fixed at a stationary frame, which is mounted above a workspace, and three middle jointed arms extending from the base. The arms, often called "kinematic chains", are connected with their first end to the base by means of universal joints and connected with their second end to an end-effector often built in form of a triangular or circular platform.

The arms are typically made of lightweight composite material and are driven by actuators located in the base. Driven by the actuators, the end-effector is movable within a motion zone. The motion zone is the 3-dimensional space the end-effector is maximally movable in. The boundaries of the maximum movement—and accordingly of the motion zone—are defined by the construction of the kinematic chains and the resulting physical limits of their common motion as being linked by the end-effector. Actuation can be done with linear or rotational actuators. As the arms are made of a light composite material, the moving parts of the Delta robot have a small inertia. This allows for very high accelerations and very fast movement, which outclasses by far speed of acceleration and movement realizable by a classical portal machine or an articulated arm.

For the implementation of a Delta robot as a part of a coordinate measuring machine, the degree of freedom of the Delta robot had been extended up to 6, allowing for the end-effector lateral movements in Cartesian directions X, Y, Z, and rotational movements around those axes resulting in yawing, rolling, pitching. Because of their high acceleration/deceleration actions and their high movement speed, Delta robots and machines based on a Delta robot are popular for picking and packaging in factories of the packaging, medical and pharmaceutical industry; some of them executing up to 300 picks per minute.

But in spite of its applicability in various technical fields, Delta robots have widespread been further regarded as not suitable for measurement requirements of coordinate measuring machines. This is because of their sensitivity to temperature fluctuation and strong vibration during fast movement and fast acceleration/deceleration actions, caused by their lightweight construction. As a result, the exact position of the end-effector cannot be determined precisely enough, and adequate focusing with optical means, e.g. an optical probe of a CMM or a camera as arranged conventionally, is not possible.

The usage of a Delta robot for moving a tactile probe of a CMM, as it is proposed in the brochure "Equator 300 Mess-Systeme" mentioned above, is not in contradiction to the statement above, but attempts to avoid these problems associated with Delta robots by using a tactile measurement probe. However, as the tactile probe has to contact the surface of the target object, the tactile probe dictates the measurement speed, which is much slower than what the Delta robot would allow. Thus, the measurement rate is limited by the tactile probe anyway and determination of its position will thus be able. Consequently, the possibilities with respect to acceleration and motion speed, enabled by the Delta structure, are not fully exploited. Furthermore, the CMM disclosed in the brochure referred to above is again only able to determine a target object with respect to a reference object, which reference object has to be measured before measuring the target object. Therefore, it has to be calibrated before the measurement. As a consequence, no decrease of measurement time is possible during preparation of the measurement, and only special trained persons will be able to handle this CMM.

Common to the types of coordinate measuring machines, adequate calibrations may work to a satisfactory extent for taking into account reproducible errors, but all non-repetitive imperfections of the mechanics fully impact a resulting measuring accuracy. So, for example if there is some play between a first axis and a second axis, none of the linear scales or angle encoders applied for determining the position of the CMM probe would have a chance to recognize such a play. Other kinds of imperfections, that are often not compensated for or require at least large efforts for a compensation, include, for example, backlash which has a big impact on the results, and, most of the time, low temperature drifts or any other kind of drifts, which are not well managed.

As far as all those negative effects are known, the usual response is to choose a top quality and expensive mechanics to minimize backlashes or plays. Another consequence is that very complex temperature compensation algorithms are applied, what not is a big issue, but always requires significant data collection phases. Most of the time, the measuring machines individually have to be calibrated at different temperatures, what is long and expensive. Despite all this, allowed temperature drifts still are limited, not really allowing for application in rough plant environments. Finally, in order to compensate for low drifts or effects of collisions, complete recalibrations have to be performed often, usually at least once a year.

SUMMARY

Some embodiments of the present invention provide a coordinate measuring machine which overcomes and best completely avoids the accuracy problems outlined above.

Some embodiments of the invention enable to directly measure the position of the end-effector/CMM probe in six degrees of freedom ("6 DoF"). Thereby, all geometrical imperfections, all plays, all backlashes and all thermal expansions shall directly be included in the 6 DoF position measurements, such that they do not anymore negatively impact the resulting accuracy.

The invention relates to a method of determining a position and orientation of an end-effector of a coordinate measuring machine (CMM), the coordinate measuring machine comprising a carrier as a support and as positioning structure for the end-effector, the end-effector being movable in at least three, particularly six, degrees of freedom and positionable by the carrier. The end-effector may be realised by a probe head enabling to determining accurate coordinate positions of a possible target object to be measured.

The CMM also comprises a stationary metrology table as a base or support for the possible target object and at least one imaging detector for capturing images in particular of at least a part of the measuring volume defined by limits of moveability of the carrier.

The method comprises moving the end-effector by the carrier, in particular according to a given part program or measuring path, and capturing images of at least a part of the measuring volume with the imaging detectors. Preferably, such images are taken continuously for providing respective position and orientation information for the probe head (end-effector) continuously.

It is to be understood that the area capturable with the imaging detector (or more that one corresponding imaging detector) does not correspond to the measuring volume. The measuring volume is defined by the volume within which a probe of the CMM can reach each position for respective measurement. The volume imaged by the cameras typically is offset to the CMM measuring volume since a "cooperative target" at the end-effector is offset to the tool center point (TCP). There may even be zero overlap between the TCP measuring volume and the capturing volume of the photogrammetrical localization system.

Therefore, the capturing area corresponds to a region which can be covered by the imaging detector(s) and which particularly at least partly overlaps the measuring volume, preferably contains the entire measuring volume. By such arrangement, covering of the end-effector with captured images can be ensured.

According to the invention, image data is received representing the image (of at least a part of the measuring volume) covering at least a part of the end-effector. The imaging detector is preferably arranged so that the end-effector is covered by respective images when measuring a target object. Moreover, image-positions of reference points related to the end-effector are determined in the image by image processing and a position of the end-effector is derived based on the image-positions of the reference points. The reference points are provided on side of the end-effector being realised e.g. by specific markers, a defined pattern or by structurally given points of interest at the end-effector. The positions of those points are determined in the captured image (image-positions) which covers the points.

Furthermore, the imaging detectors are firmly mounted to the metrology table and are arranged mechanically de-coupled from the carrier.

An immediate benefit of this inventive approach showing the above features is that the mechanical quality, i.e. resistance to vibrations and other mechanical instabilities related to a typical CMM, is of reduced importance with respect to measurement results to be acquired using this CMM. A major remaining constraint on the carrier is that high frequency movements (like vibrations) is be avoided, as the frame rate supplied by the imaging detectors usually is only up to a few hundreds hertz, whereas vibrations can reach frequencies in the kilohertz range or even beyond. To a certain extent, such fast movements also could be measured using additional sensors like an inertial measurement unit IMU, gyros and magnetometers. In that case, however, an integration of low frequency image signals and high speed signals of such additional sensors would be required (see below).

Even more advantageously, according to a particular embodiment of the invention, more than one imaging detector is mounted to the metrology table for taking images of the end-effector. By arranging more cameras and jointly using image information of those cameras, precision of position-determination for the end-effector increases significantly.

For that, the coordinate measuring machine comprises at least two, in particular three, imaging detectors, wherein the method of determining the position and orientation of the end-effector comprises capturing images of at least a part of the measuring volume with the at least two imaging detectors and receiving image data representing the captured images each of which being captured with a different of the imaging detectors and covering at least a part of the end-effector.

Furthermore, the image-positions of the reference points related to the end-effector are determined in each image by image processing and the position of the end-effector is derived based on the image-positions of the reference points. By doing so, the derived image-positions of several images are used for position (and orientation) determination of the end-effector which leads to higher accuracy. Moreover, the at least two imaging detectors are firmly mounted to the metrology table and arranged mechanically de-coupled from the carrier.

Particularly, for synchronisation, the images are acquired at certain instance of time by the imaging detectors.

According to a preferred embodiment, the position determination is based on images from all imaging detectors, taken from the possible target object and/or the end-effector in one and the same position, particularly at the same time.

This ensures a reliable determination of the target position based on the images from all applied imaging detectors, even if the target is moving. —In other words: All imaging detectors will take a picture of the same target, ensuring very coherent information. If the cameras would not be perfectly synchronized, the physical position of the target would be different on images taken by different detectors, resulting in a poor accuracy of position determination.

However, even though the imaging detectors would be triggered with a common external signal, a guaranty would be hardly available from a detector manufacturer that a precise latency time could be ensured between a determined flank of the trigger signal and the effective image acquisition. Again, such an uncertainty might decrease the positioning accuracy.

For overcoming those limitations, defined shutter times of the imaging detectors can be triggered (e.g. by a control unit of the CMM) so that a temporally common image acquisition period is provided for the imaging detectors, the end-effector can be illuminated for a defined illumination period during the common image acquisition period and the images of the image data can be acquired with the imaging detectors each representing the end-effector in a defined (identical) state corresponding to the illumination period. In other words, each captured image represents the end-effector in its defined state of illumination form an alternative perspective (pose).

In particular, the end-effector is illuminated in a pulsed manner having an illumination frequency and the illumination period, the illumination frequency being synchronized with the shutter times (and/or a frame rate) for the imaging detectors. Alternatively, the end-effector can also be illuminated non-periodically (without a fixed frequency), but still also synchronized with the camera exposure times.

The flashing light source illuminates the end-effector during shutter-opening times (in particular synchronised with respective frame rates) of the imaging detectors/cameras. Consequently, even if the detector shutters do not open and close within the same time intervals following a trigger signal, the acquired images are dominated by the light flash duration, provided that the intensity of the light flash is much stronger than the ambient light intensity. As a result, accordingly acquired images appear to be perfectly synchronized.

According to a more specific embodiment, movements of the end-effector are synchronized with frame rates of the imaging detectors such that images are taken only when the carrier remains static during the acquisition period, wherein high-frequency movements faster than 200 Hz are avoided.

Concerning calibrations of the entire measuring system, reference markers provided at the stationary metrology table may be covered by at least one image of the image data, respective marker-positions can be determined in the respectively at least one image by image processing and a respective pose of a respective imaging detector is derived based on the marker-positions (e.g. by geometrical resection methods). By doing so, in particular, a calibration of the poses of the imaging detectors against the reference markers is provided.

The present invention also relates to a coordinate measuring machine (CMM), comprising a carrier as a support and positioning structure for an end-effector, the end-effector being movable in up to six degrees of freedom and positionable by the carrier; a stationary metrology table as a support for a possible target object; and a control unit controlling the moving of the end-effector by the carrier and controlling image acquisition with an imaging detector.

A tool holder may be comprised in or attached to the end-effector, such a tool holder being configured to accommodate various measurement probes. In particular, the end-effector is represented by a probe head comprising a probe element, e.g. a stylus having a probe tip at its distal end.

The motion and positioning of the end-effector may be effected by means of any kind of positioning system providing a positioning accuracy adequate for a CMM, under control by a control unit which may be located in a base or remote.

The CMM further comprises at least one imaging detector for capturing images of at least a part of the measuring volume (motion zone), and an analysing unit for processing electronic signals and/or data delivered by the imaging detector.

The analysing unit typically comprises storage means for storing the delivered images and comprises a circuit unit for processing said images.

According to the invention, the imaging detector is firmly mounted to the metrology table and is mechanically de-coupled from the carrier. Moreover, the analysing unit is configured to determine a position (and orientation) of the end-effector in six degrees of freedom by receiving image data representing an image covering at least a part of the end-effector, determining image-positions of reference points related to the end-effector in the image by image processing and deriving a position of the end-effector in six degrees of freedom based on the image-positions of the reference points.

According to one embodiment of the invention, the coordinate measuring machine comprises at least two, in particular three, imaging detectors firmly mounted to the metrology table and mechanically de-coupled from the carrier. Here, the analysing unit is configured to determine the position of the end-effector in six degrees of freedom by receiving the image data representing images each of which being captured with a different of the imaging detectors and covering at least a part of the end-effector, determining the image-positions of the reference points related to the end-effector in each image and deriving the position of the end-effector based on the image-positions (in the set of images) of the reference points.

Using at least two, in particular three, cameras and processing image data generated by those cameras for determining the position of the end-effector results in greater accuracy regarding position-determination.

According to one embodiment, the control unit is designed and configured so that the image data is generated by capturing images with each imaging detectors of the end-effector which is in one and the same position for all acquired images, particularly at the same time. The images thus represent the end-effector in constant and same state and provided a precise base for further processing of image data and determination of the position and orientation of the end-effector.

In particular, the position determination is based on images from all (at least two) imaging detectors in order to provide improved positions accuracy.

According to one embodiment, the carrier is built as or comprises a Delta robot. Alternatively, the carrier is represented by a portal of a portal-CMM or by an articulated arm.

The motion zone (corresponding to the measuring volume) of the end-effector, together with any components comprised therein or attached thereto, thus can be defined and limited by arms, i.e. kinematic chains, of the Delta robot as being linked at their ends by the end-effector.

According to one embodiment, the Delta robot comprises three arms, each of them having a first part jointed to a second part, the first parts being connected to a stationary base and the second parts being connected to the end-effector.

The Delta robot of a CMM according to recent developments typically has a stationary base fixed at a stationary frame and comprises kinematic chains, which are middle jointed arms. As usual, the joints can be provided with angle encoders, also called position sensors, in order to deliver according angle signals, so that the current position of the end effector with the camera can be derived and used by the analysing unit and the control unit. Advantageously, the imaging detectors may have a field of view encompassing at least 20% of the motion zone.

It is also advantageous if the imaging detectors are high speed detectors being able to take pictures/images very fast, i.e. with more than 360 frames per second. Advantageously, the imaging detectors are controlled in a way for taking pictures with a high clock rate, e.g. with 500 frames per second or even more. In particular, the cameras are designed and controlled so that image acquisition is faster than twice the highest mechanical eigenfrequency that may be excited (at the CMM) so that interpolation (of image data) can be effective.

According to a preferred embodiment, the imaging detectors are embodied as cameras.

According to a further embodiment, the end-effector is illuminated, in particular by means of an LED array. In general, the light source may comprise a plurality of individual light sources under a common control. The light source may be attached to the base. However, the light source may also be integrated into the end-effector or attached to the imaging detectors.

In case of pulsed illumination, the flashing light source illuminates the end-effector and/or target object or cooperative target during shutter-opening times (frame rates) of the imaging detectors/cameras. Consequently, even if the detector shutters do not open and close within the same time intervals following a trigger signal, the acquired images are dominated by the light flash duration, provided that the intensity of the light flash is much stronger than the ambient light intensity. As a result, accordingly acquired images appear to be perfectly synchronized.

According to a further embodiment, the CMM is additionally provided with a sensor unit comprising multiple sensors, wherein, in particular, the sensor unit is supported by the end-effector and the multiple sensors are dedicated for relative position determinations and/or displacement determinations. In particular, the multiple sensors are embodied as multi axis acceleration sensors and/or an inertial measurement unit IMU and/or gyros and/or magnetometers, in particular enabling signal acquisition at a high frequency.

Using signals of acceleration sensors allows for position determinations with improved accuracy by eliminating vibration effects to a great extent. Another option is to provide tilt sensors for the horizontal x-axis and y-axis in the sensor unit in order to determine positions even more precisely.

It is preferred that an integration of signals from the multiple sensors of the sensor unit, particularly of high-frequency signals, and of signals from the imaging detectors, particularly of low-frequency signals originating from absolute position measurements in six degrees of freedom, is performed using sensor fusion algorithms, in particular using a Kalman filter.

It is further preferred that reference markers are provided on the metrology table in a region where the possible target object is placed, particularly enabling a calibration of positions of the cameras against these reference markers, whereby it is assumed that the reference markers are in the field of view of the cameras. Based on these features, system calibrations and compensations for slow drifts are enabled, by combining signals from the multiple sensors of the sensor unit and signals from the imaging detectors and also making use of the reference markers.

According to a further embodiment, the end-effector is provided with a geometrical pattern providing the reference points and/or with one or more reference markers. Thus, particularly an automated calibration of the end-effector, including the reference markers, against the cameras is enabled.

According to another embodiment, the end-effector comprises a cooperative target having a triangular shape and being provided with a triangular or chessboard-like geometrical pattern and with markers for orientating and positioning the cooperative target.

Thereby, this means that the "end-effector" can also be identical with the "cooperative target".

In case of using "only" one imaging detector a 3D target may be arranged at the end-effector for providing respective reference points based on which a precise position and orientation of the end-effector can be calculated. By doing so, the reference points are not entirely located in one common plane and thus enable a precise localization of the target.

It is preferred that the cooperative target and/or structures carrying reference markers are provided in a material having a low and/or stable coefficient of thermal expansion CTE. In the latter case, a "stable CTE" meaning a dimension change proportional to a temperature change, advantageously a temperature sensor is provided such that a dimension change due to temperature changes can be easily taken into account in a calculation for compensation purposes.

According to one embodiment, the cooperative target is manufactured from Borofloat glass. —Borofloat glass is low-cost and has a low CTE. According to another embodiment, the cooperative target is manufactured from a material specifically engineered to have a low CTE such as Zerodur or Invar (which have a near zero CTE).

Advantageously, the geometrical pattern of the cooperative target is printed in high image quality, specifically with low gloss, high contrast and high sharpness, for example on an ultra-matte "fine arts" paper (or any other high quality paper with near zero gloss and a flat surface structure) to be glued onto the support, particularly from Borofloat glass.

A further aspect of the invention relates to effects of the positioning/driving system on the mechanical system stability. As already mentioned above, movements without vibrations are mandatory to reach the required accuracy, and, therefore, the driving system of the carrier is critical. In order to keep the size of the motor small enough (which is significant not only with respect to system size/weight, but also costs) and to use it at efficient operation speeds, it is usually necessary to have a reduction between the motor axis and the driving axis. Several technical solutions are known, but most of them are associated with some play or some backlash, for example when using a gear mechanism. Technical solutions using belts usually are not very stiff or generate vibrations when tooth belts are in use.

Therefore, according to a further embodiment of the invention, a driving system of the carrier comprises a motor axis and a driving axis, wherein a reduction between the motor axis and the driving axis is provided, in particular by means of a cable reduction.

This friction-based solution for a reduction is associated with the following advantages:
High stiffness;
Absolutely no play;
Easy and cheap to manufacture.

BRIEF DESCRIPTION OF THE FIGURES

The invention will be explained in greater detail below with reference to examples of possible embodiments. Same elements in the figures are indicated by the same index numbers. It should be understood that the drawings are diagrammatic and schematic representations of such example embodiments and, accordingly, are not limiting the scope of the present invention, nor are the drawings necessarily drawn to scale. In the drawings show schematically:

FIG. 6b a detailed view of parts of the cable reduction according to FIG. 6a.

DETAILED DESCRIPTION

Figure 1A:
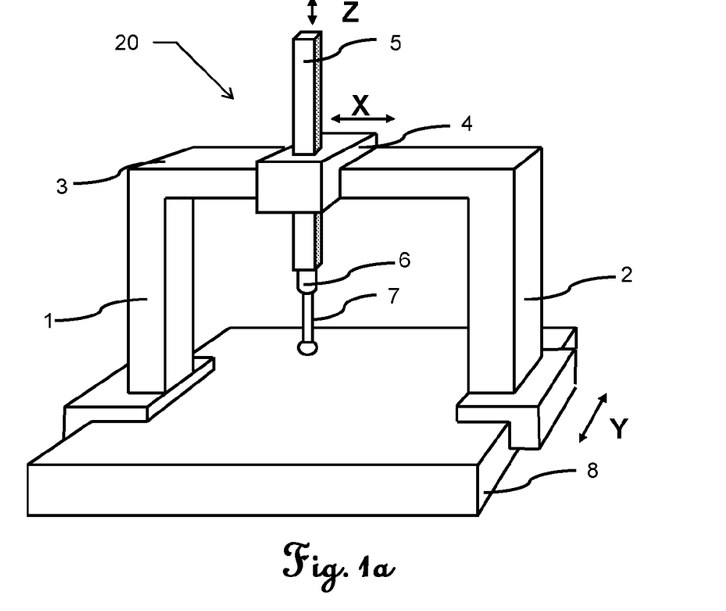
FIG. 1a as a first example of a prior art coordinate measuring machine CMM, a "portal" or "bridge-type" CMM.

FIG. 1a shows, as a first example of a prior art coordinate measuring machine CMM, a "portal" or "bridge-type" CMM 20. The bridge-type CMM comprises a base 8 (metrology table) and a frame structure (carrier of the CMM) for linking a tool carrier 6 (end-effector) to the base 8. The first frame component is a portal having two portal legs 1 and 2, which are connected by a bridging portion 3 at their upper ends. Driven by a drive mechanism (not shown), the frame component is capable to move along the longitudinal sides of the base 8. This direction corresponds to a direction Y.

An X-carriage 4 is, movably in X direction, arranged on the bridging portion 3 of the frame component. The movement of the carriage 4 (which is to be seen as a further frame component) may also be achieved by a rack and pinion. A vertical rod 5 (sleeve, Z-ram), building a further frame component, is movably incorporated into the carriage 4. At the bottom portion of the vertical rod 4, a tool carrier 6 holding an attached stylus 7 is provided. The stylus may be understood as being part of the end-effector as well.

The tool carrier 6 is movable to any desired point in a measuring volume (work zone) of the coordinate measuring machine 20 in the directions X, Y and Z. The measuring volume is defined by the base 8 and the frame components 1, 2, 3 and, in particular, by the range of movability of the carriage 4. The three space directions X, Y and Z are preferably orthogonal to one another, although this is not necessary for the present invention. It should be noted that a drive mechanism and a controller for driving the frame components and, thus for driving the tool carrier 6, are not shown.

In the shown embodiment, the base 8 may comprise a table with a granite surface plate, in particular the base is made of granite, for supporting the object to be measured, on which the space coordinates of at least one measurement point are intended to be determined.

Not shown is a controlling and processing unit, which is designed to actuate the motor drives of the coordinate measuring machine 20, such that the end-effector 6 travels to a pre-determined measurement point. The controlling and processing unit comprises a processor and a memory.

Figure 1B:
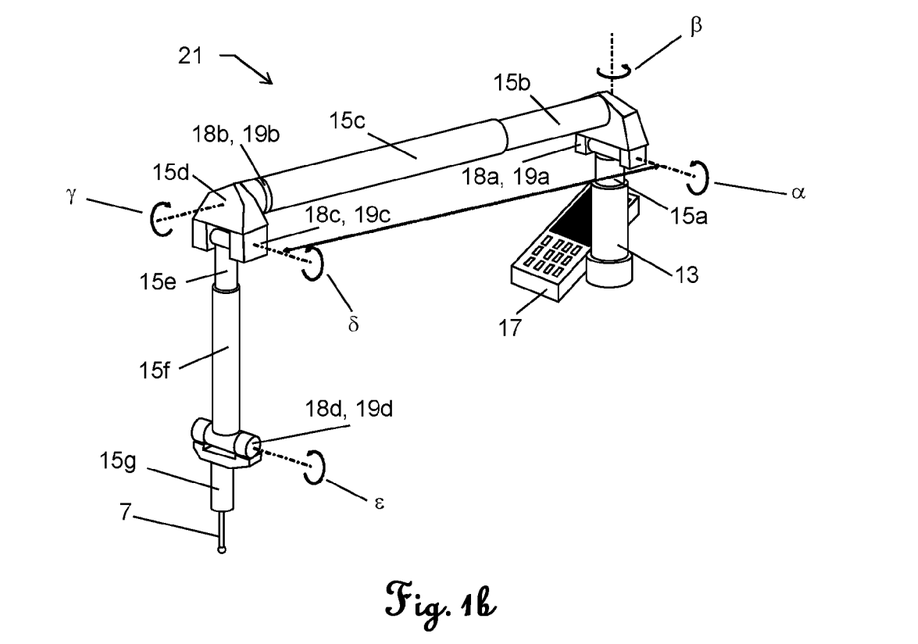
FIG. 1b an articulated arm CMM according to the state of the art.

FIG. 1b shows an articulated arm CMM 21 according to the state of the art. Here the arm corresponds to a carrier of the CMM. The CMM is designed for determining a measuring position of the probe 7. Therefore, the articulated arm CMM 21 comprises a base 13 which forms the support of the CMM and which can be positioned onto a surface, particularly a floor or a table. The base 13 and/or the surface represent a stationary metrology table in sense of the present invention. Connected to the base 13, several arm-components 15a-15g are linked by hinge and swivel joints 18a-18d, the arm-components 15a-15g thus being movable with respect to one another. The joints 18a-18d provide for substantially resisting force-free and supporting force-free rotary movability, so as to enable precise measurement of the actual relative setting of each joint.

A first arm-component 15a is linked with and movable with respect to the base 13, a second arm-component 15b is linked with and movable with respect to the first arm-component 15a, and so on. The last arm-component 15g (end-effector), which forms the end of the articulated arm and can be compared, in its functionality, with the stylus holder 6 of FIG. 1a, —has attached a probe 7, the probe 7 thus being freely movable within a given volume. For example, the probe 7 is manually operable by a user and may be designed as a ruby ball, for contacting a surface point to be measured.

Furthermore, sensing units 19a-19d are allocated to the hinge and swivel joints 18a-18d, the sensing units 19a-19d being formed for measuring an actual relative setting of each of the joints 18a-18d. Thereby, the sensing units 19a-19d are, for example, installed in the housings of the corresponding joints 18a-18d. For example, opto-electronic angle sensors are used as the sensing units to measure an actual angle $\alpha$, $\beta$, $\gamma$, $\delta$, $\epsilon$ between two arm-components 15a-15g linked by the corresponding joint 18a-18d.

The measured actual setting of each joint 18a-18d is transmitted to a computing unit 17. By combining the relative settings of each joint 18a-18d, the computing unit 17 calculates the internal position of the probe 7—respectively the position of the point being touched by the probe 7—relative to the base 13 of the coordinate measuring machine 21. For example, the coordinates of the calculated internal position relative to the base 13 may be displayed on a display of the computing unit 17.

Figure 2:
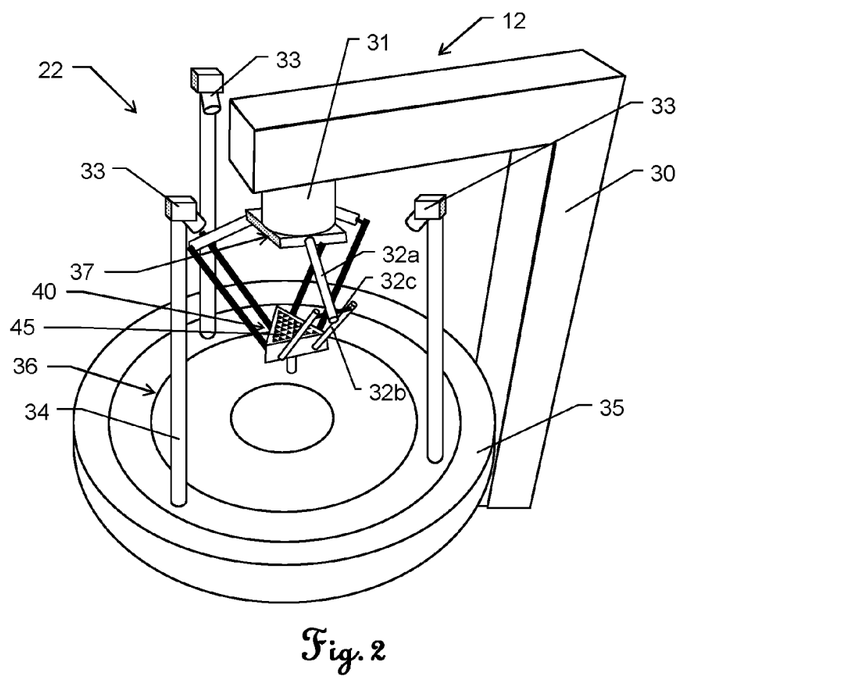
FIG. 2 a CMM according to the invention having a Delta robot as a supporting structure.

FIG. 2 shows a coordinate measuring machine 22 (CMM) according to the invention having carrier embodied as a Delta robot 12 as a supporting structure.

The Delta robot 12 comprises a stationary frame 30 supporting a stationary base 31, and three arms, also called kinematic chains. The frame 30 may be embodied as a massive construction. Each arm has two parts 32a, 32b which are linked by a middle joint 32c. The first part 32a of each arm is connected to the stationary base 31, and the second parts 32b are connected to an end-effector 40, which is movable by means of the components of the Delta robot 12 in three degrees of freedom (3 DoF). However, parasitic movements may occur in up to six degrees of freedom like e.g. a rotation caused by one arm is getting warmer than others. The end-effector 40 in this case is built in triangular form, but may also be embodied, e.g., as a circle like plate, for example designed for supporting a tool, a probe, etc. The end-effector 40 is particularly configured in a way that any attached elements are interchangeable. The end-effector 40 may comprise a geometrical pattern 45 (see also FIGS. 5a and 5b) for providing reference points.

A stationary metrology platform or metrology table 35 is used as a support and for positioning of a possible target object or so-called "cooperative target". The metrology table 35 may have the shape of a disk.

At least two, in the shown preferred case three imaging detectors 33, here embodied as cameras, are provided for precisely determining the position of the end-effector 40, in particular of the geometrical pattern. The number of imaging detectors/cameras are designed and arranged (positioned) so that a complete, detailed view of the whole cooperative target is enabled.

For determining the position of the end-effector the cameras acquire images of the pattern 45 at the effector 40. A number of reference points, in particular represented by the black/white contrast provided by the triangles of the pattern 45, is provided with the end-effector 40 the positions of which are determined in the acquired images and image-positions are derived (using image processing). Based on the image-positions of the reference points the relative positions and orientation of the end-effector 40 with reference to a coordinate system of the CMM 22 can be calculated. The more reference points are provided and identified, the more precise such determination would be.

According to the invention, the imaging detectors 33 are firmly mounted to the metrology table 35, mechanically de-coupled from the carrier (Delta robot 12). According to an embodiment of the invention, also the metrology table 35 is mechanically completely de-coupled from the carrier.

In the shown example, the cameras as imaging detectors 33 are attached to columnar supports 34, e.g. at a height of 550 mm above the level of the metrology table 35, the columnar supports 34 being mounted on the metrology table in a circular arrangement. The reference numeral 36 indicates a 440 mm radius of the camera field of view projected onto the metrology table 35. A light source 37, for example embodied as a LED array, may be used for illumination of the end-effector 40 and/or a possible cooperative target/ target object. The light source 37 may be attached to the base 31, like in the embodiment of FIG. 2. However, the light source 37, which may comprise a plurality of individual light sources, may also be integrated into the end-effector 40 or attached to the imaging detectors 33.

The end-effector 40 may additionally comprise sensors like acceleration sensors for measuring accelerations and/or decelerations in X-, Y- and Z-directions, gyroscopes for measuring rotations or a full 6-DOF inertial measurement unit IMU, what however is not necessarily demanded for the present invention in general.

An immediate benefit of a CMM 22 according to the invention is that the mechanical quality, i.e. its resistance against mechanical drift and vibrations in particular, is no longer of essential importance, as the position of the end-effector 40 itself is directly measured, preferably in a coordinate measuring system relating to the object to be measured. The only remaining constraint on the mechanical properties of the carrier is that high frequency movements (like high frequency vibrations) must be avoided, as the frame rate supplied by the cameras usually is only up to a few hundred hertz, whereas vibrations could reach frequencies in the kilohertz range or even beyond. To a certain extent, those fast movements also could be measured using IMUs, gyros and magnetometers. In this case, however, an integration of the related measured signals can happen (for example when using accelerometers to get a position) in the course of data evaluation, and the results of the additional sensors only meaning displacements, not absolute positions. Consequently, the measurement results delivered by such additional sensors may be regarded and treated as complementary data. However, it is advantageous to bridge the gap between the absolute position data extracted from the imaging detectors 33 and such complementary measurement data, which also are subjected to drift effects. Accordingly, as a further development of the invention, sensor fusion algorithms, in particular comprising a Kalman filter, are applied in the course of data evaluation and analysis.

In case that the here-described positioning system is synchronized in time with any end-effector mounted sensors (such as cameras, distance sensors or tactile probes), then the requirement on vibration is greatly relaxed since interpolation is not required. Then, vibrations must only be low enough that the setup is "still" (static) during the exposure time of the measurements.

Obviously, the columnar supports 34 of the imaging detectors 33 must be stable relative to the metrology table 35. Since this assembly (comprising metrology table 35, columnar supports 34 and cameras 33) contains no moving parts and is de-coupled from the Delta robot 12, mechanical stability is, however, much easier to achievable for this assembly than for the carrier/Delta robot 12.

The use of several cameras for determining the position of an object is well-known and widely described in the photogrammetry domain. For all such solutions for position determination based on camera images, one of the first prerequisites is to extract the relative positions of the different cameras. Several solutions exist, but the arrangement as implemented by the present invention is associated with a significant advantage. The known cooperative target (reference markers) at the metrology table or the geometrical pattern can be used for the determining relative positions of the cameras 33, and the pattern can easily be moved to different locations, in order to repeat the position estimates, what reduces any resulting uncertainty. The system being operated in an automatic manner, the adequate number of iterations for a precise determination of the camera positions is only limited by the time of disposal, measurements at several different positions, in any case, greatly improving the resulting accuracy.

However, there are further important prerequisites to be fulfilled for a good position determination with the coordinate measuring machine according to the invention, based on camera images:

1. All cameras 33 must take images of the same target located at the same position, for ensuring coherent information. —This condition is relatively easily satisfied, but by far not sufficient.

2. All camera images dedicated for the same position determination must be taken at exactly the same time, as during most of the time, the target is moved by the carrier/Delta robot. —For satisfying this condition, a perfect synchronisation of the cameras has to be established, in order to ensure that the physical position of the target in all commonly assigned images really is the same.

3. Finally, even if the cameras 33 are triggered with a common external signal, no guaranty is given by the camera manufacturers that a precise latency time can be ensured between a determined flank of a trigger signal and the effective image acquisition. Again, this uncertainty decreases the position determination accuracy.

Figure 3:
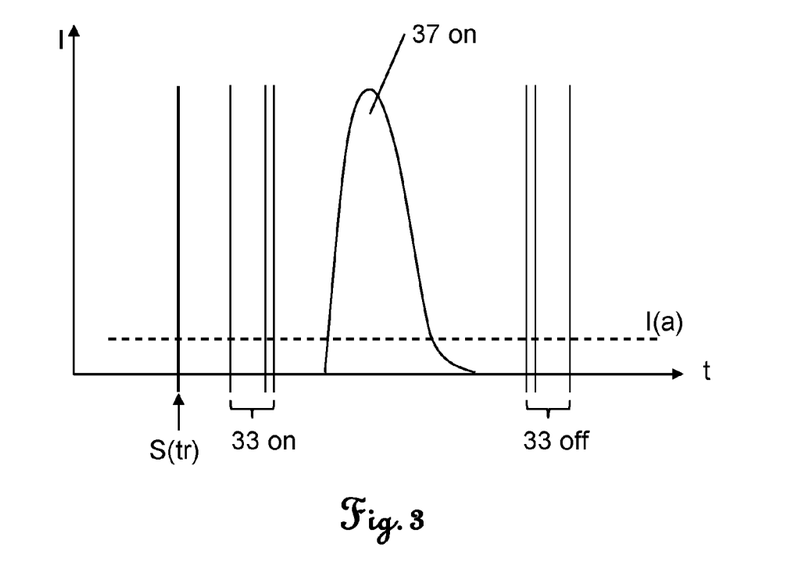
FIG. 3 an illustration of a synchronization between a flashed illumination of the target and exposure times of imaging detectors used in the CMM according to FIG. 2.

FIG. 3 illustrates a solution for this last mentioned problem, using a flashing light source 37 for illumination of the end-effector, e.g. the geometrical pattern at the end-effector, during the shutter opening times (between "33 on" and "33 off") of the cameras. Although the shutter opening times of the individual cameras do not start exactly at the time after a trigger signal S(tr) and do not have exactly the same length, as obvious from FIG. 3, the acquired individual images mainly depend on the light generated by the LEDs 37, as it is much stronger than the ambient light I(a), resulting in an effective identical exposure time of all three cameras and accordingly acquired perfectly synchronous images during the light flash "37 on".

Figure 4:
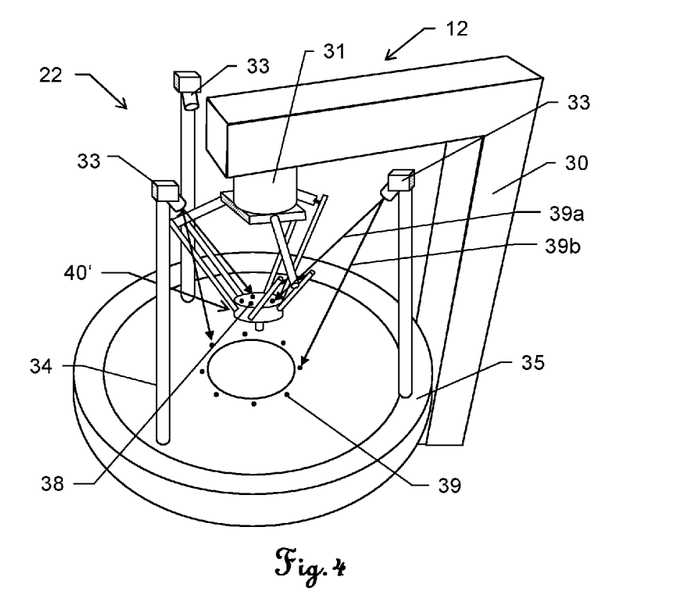
FIG. 4 another embodiment of a still another embodiment of CMM according to the invention.

Following the improvements associated with the further developments of the invention as outlined above, the photogrammetry results are excellent, but the system is still unable to recognise any internal drift of the system. Such an internal drift can, for example, occur as a thermal expansion of a columnar support 34 due to a heat source, and the falsified result would become evident when the next system calibration will be performed. For overcoming this issue, a solution is presented in FIG. 4: Reference Markers 39 are provided on the measuring table 35 and additionally reference markers 38 on the probe or end-effector, in the field of view of the cameras 33 indicated by arrows 39a, 39b. Thus, the cameras 33 and probe markers 38 can be calibrated against each other and the positions of the cameras 33 may be recalibrated on-line against the reference markers 39 at the metrology table 35. According to one embodiment, reference markers are provided in a material having a coefficient of thermal expansion CTE close to zero, but also any other material having a low uncertainty. i.e. stable, CTE in combination with a temperature sensor.

Furthermore, also the design of the end-effector and/or of its geometrical pattern has a big impact on the final accuracy of the outcome of the camera measurements. It is important to have enough reference points, but all those have to have enough space between them, in order to allow for an univocal differentiation, especially when the target is tilted (not perpendicular) with respect to the optical axis of the camera field of view.

Figure 5A:
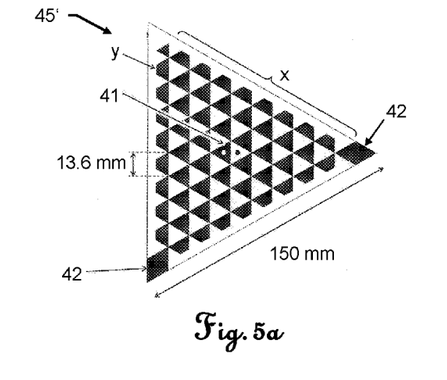
FIG. 5a a possible design for an end-effector/cooperative target.

A possible design for the geometrical pattern 45', which may also be called a "reference plate", is shown in FIG. 5a.

The triangular ground shape, with a lateral extension of e.g. 150 mm, is sub-divided into small triangles with a base length of, for example, 13.6 mm, resulting in a number of x, for example 9 corners per side, corresponding to 45 corners in total. Small triangles arranged subsequent/adjacent to one another are provided, in an alternating manner, in black and in white. Cut corners and white edges, as indicated by the reference numeral "y", reduce a risk of false positive corner determinations. In this case, two outer target orientation markers 42 are printed in black, which support correct orientation when positioning this reference plate. Additionally, two inner orientation markers 41 are provided in this case.

As a material for such a reference plate, Borofloat glass material may be used, as it is both low-cost (lower than Invar or Zerodur for example) and has a very low coefficient of thermal expansion and can, therefore, also serve as a reference length artefact for the calibration of the camera pixels (corresponding to the real length of the triangle bases). For achieving a required high image quality (low gloss, high contrast & high sharpness), the pattern itself is preferably inkjet-printed on an ultra-matte fine-arts paper. The latter one was directly glued onto the Borofloat plate for the shown example.

This example reference plate shows the following properties:
Triangular shape allowing to use all the surface at disposal in the delta structure;
170 corner features (today, algorithms for locating large numbers of features are fast and accurate);
Excellent image quality;
Easy to calibrate thanks to flat shape and scale-invariant features (using a vision machine for instance);
Different orientation markers facilitating correct calibration orientation.

Figure 5B:
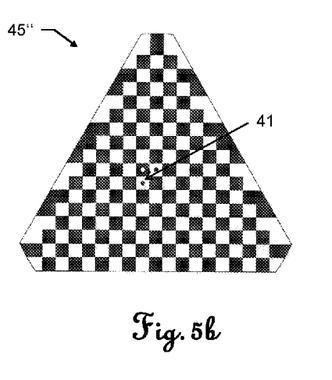
FIG. 5b another possible design for an end-effector/cooperative target.

FIG. 5b shows an alternative embodiment of a reference plate or cooperative target 45". In this case, square patterns are used to facilitate image recognition when observing this target under perspective (tilted vision), as the square patterns are helpful for avoiding errors due to camera non-linearity.

For achieving the required measurement accuracy, still another aspect is important.

As already mentioned above, movements without vibrations are mandatory to reach the needed accuracy and, therefore, the driving system of the carrier is critical. For keeping the size of the motor small enough and for operating the driving system at speeds allowing for sufficient efficiency, it is necessary to have a reduction between the motor axis and the driving axis. Several solutions for this purpose are known, but most of them are associated with some play or some backlash, like when using a gear mechanism for instance. Problem solutions based on belts usually do not provide sufficient stiffness or generate vibrations when tooth belts are in use.

Figure 6A:
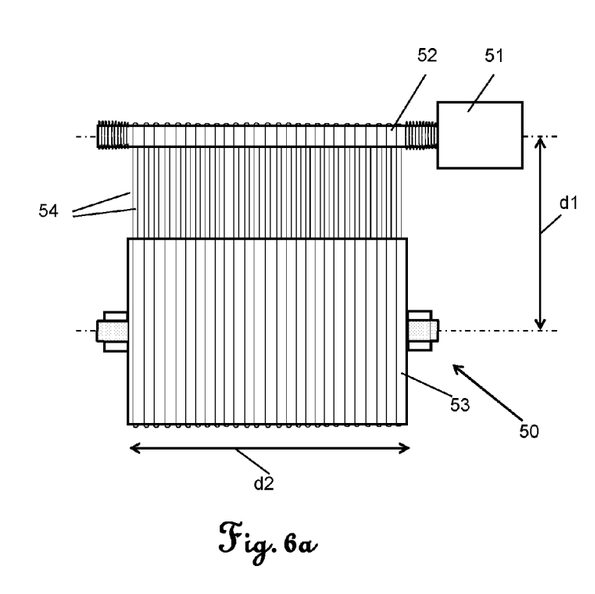
FIG. 6a a cable reduction for a driving system for a CMM according to the invention.
Figure 6B:
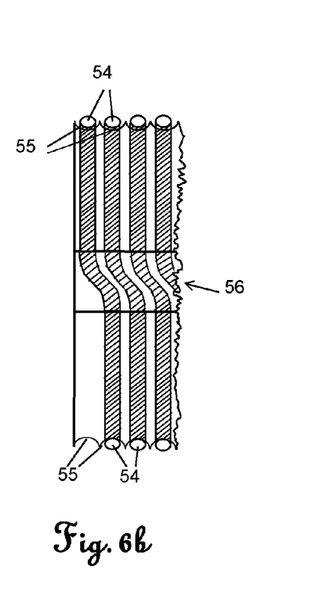

In the context of the present invention, a cable reduction is proposed, as illustrated by FIG. 6a and FIG. 6b. A cable 54 is wrapped (several turns) around the motor axis 52, the latter being driven by a motor 51, and around the driving axis 53, which has a much bigger diameter than the motor axis 52 for providing a required reduction (see FIG. 6a). A notch 56, in detail shown in FIG. 6b, promotes to guide the cable 54 from one groove 55 to the next groove. This solution allows machining all the grooves 55 as single circular grooves, not having to manufacture a complex spiral along the whole driving axis.

This friction-based solution for a reduction is associated with the following advantages:

High stiffness;
Absolutely no play;
Easy and cheap to manufacture.

It should be noted that the above solution for a reduction, as illustrated in FIG. 6a and FIG. 6b, has only a limited working angle, what, however, is not an issue for the purpose of the current invention.

In summary, the present invention is distinguished by the following advantageous aspects:
Precise measurement and position determination of the position of a target object is enabled in 6 DoF, upon simultaneous avoiding of negative impacts from the carrier (e.g. due to backlashes, plays, bendings, thermal expansions, temporal instability . . . ).
The above capability of precise measurements allows relaxing the stability requirements for the carrier and consequently reducing the price.
The invention enables to execute the position measurements and determinations at low frequencies in 6 DoF using imaging detectors/cameras, when required in combination with high-frequency measurements of relative displacements by using IMUs, gyros and/or magnetometers.
A cooperative target (geometrical reference pattern) manufactured from a material having a low or at least stable coefficient of thermal expansion enables automated system calibrations, particularly integrated into the general system control and operation.
The cooperative target, in particular under optimum illumination is imaged at one and the same position from all (three) cameras, leading to excellent photogrammetry results.
A cooperative target, particularly embodied as a reference plate with a characteristic geometrical pattern, allows for compensating slow drift effects, for example of temperature-induced drift.
A mechanical reduction of the driving system, featuring high stiffness, absence of play low cost, is implemented in the system according to the invention.

The invention may generally be used with all types of coordinate measuring machines (as for instance shown with FIGS. 1a and 1b), i.e. with a CMM being designed as parallel kinematics machine as well as with a CMM having linear or serial kinematics. Exemplarily, the CMM may be designed as bridge-type, L-bridge-type, horizontal-arm-type, cantilever-type or gantry-type machine.

Although the invention is illustrated above, partly with reference to some specific embodiments, it must be understood that numerous modifications and combinations of different features of the embodiments can be made and that the different features can be combined with calibration principles and/or coordinate measuring machines known from prior art.

What is claimed is:
1. A method of determining a position of an end-effector of a coordinate measuring machine, the coordinate measuring machine comprising:
a carrier as a support and positioning structure for the end-effector, the end-effector being movable in at least three degrees of freedom and positionable by the carrier,
a stationary metrology table as a support for a possible target object and
at least one imaging detector for capturing images;
the method comprising:
moving of the end-effector by the carrier and capturing an image of at least a part of a measuring volume with the imaging detector, wherein:

receiving image data representing the image covering at least a part of the end-effector, determining image-positions of reference points related to the end-effector in the image by image processing and deriving a position of the end-effector based on the image-positions of the reference points, wherein the at least one imaging detector is firmly mounted to the metrology table and arranged mechanically de-coupled from the carrier.

2. The method as claimed in claim 1, wherein:

the coordinate measuring machine comprises at least two imaging detectors, wherein the method comprises capturing images of at least a part of the measuring volume with the at least two imaging detectors, receiving the image data representing the images each of which being captured with a different of the imaging detectors and covering at least a part of the end-effector, determining the image-positions of the reference points related to the end-effector in each image by image processing and deriving the position of the end-effector based on the image-positions of the reference points, wherein the imaging detectors are firmly mounted to the metrology table and arranged mechanically de-coupled from the carrier.

3. The method as claimed in claim 2, wherein:

triggering shutter times of the imaging detectors so that a temporally common image acquisition period is provided for the imaging detectors, illuminating the end-effector for a defined illumination period during the common image acquisition period and acquiring the images of the image data with the imaging detectors each representing the end-effector in a defined state corresponding to the illumination period, wherein the end-effector is illuminated in a pulsed manner having an illumination frequency, the illumination frequency being synchronized with the shutter times for the imaging detectors.

4. The method as claimed in claim 1, wherein:

movements of the end-effector are synchronized with frame rates of the respective imaging detectors such that images are taken only when the carrier remains static during the acquisition period, wherein high-frequency movements faster than 200 Hz are avoided.

5. The method as claimed in claim 1, wherein:

covering reference markers provided at the stationary metrology table by at least one image of the image data, determining respective marker-positions in the respectively at least one image by image processing and deriving a respective pose of a respective imaging detector based on the marker-positions, wherein a calibration of the poses of the imaging detectors against the reference markers is provided.

6. A coordinate measuring machine (CMM), comprising:

a carrier as a support and positioning structure for an end-effector, the end-effector being movable in at least three degrees of freedom and positionable by the carrier, a stationary metrology table as a support for a possible target object, at least one imaging detector for capturing images, a control unit controlling the moving of the end-effector by the carrier and controlling image acquisition with the imaging detector, and an analysing unit for processing electronic signals and/or data delivered by the imaging detector, wherein:

the imaging detector is firmly mounted to the metrology table and mechanically de-coupled from the carrier and the analysing unit being configured to determine a position of the end-effector in six degrees of freedom by receiving image data representing an image covering at least a part of the end-effector, determining image-positions of reference points related to the end-effector in the image and deriving a position of the end-effector based on the image-positions of the reference points.

7. The coordinate measuring machine as claimed in claim 6, wherein:

the coordinate measuring machine comprises at least two imaging detectors firmly mounted to the metrology table and mechanically de-coupled from the carrier and the analysing unit being configured to determine the position of the end-effector in six degrees of freedom by receiving the image data representing images each of which being captured with a different of the imaging detectors and covering at least a part of the end-effector, determining the image-positions of the reference points related to the end-effector in each image and deriving the position of the end-effector based on the image-positions of the reference points.

8. The coordinate measuring machine as claimed in claim 7, wherein:

the control unit is designed and configured so that the image data is generated by acquiring images with each imaging detectors of the end-effector being in one and the same position.

9. The coordinate measuring machine as claimed in claim 7, wherein:

the control unit is designed and configured so that the image data is generated by acquiring images with each imaging detectors of the end-effector being in one and the same position, acquiring the images at the same time.

10. The coordinate measuring machine as claimed in claim 7, wherein:

the position determination is based on images from all imaging detectors.

11. The coordinate measuring machine as claimed in claim 10, wherein:

the geometrical pattern is provided in a material having a low and/or stable coefficient of thermal expansion (CTE).

12. The coordinate measuring machine as claimed in claim 10, wherein:

the cooperative target being manufactured from Borofloat glass and/or the geometrical pattern of the cooperative target being printed in high image quality, specifically with low gloss, high contrast and high sharpness.

13. The coordinate measuring machine as claimed in claim 6, wherein:

the carrier is built as or comprises a Delta robot, wherein the Delta robot comprises three arms, each of them having a first part jointed to a second part, the first parts being connected to a stationary base and the second parts being connected to the end-effector.

14. The coordinate measuring machine as claimed in claim 6, wherein:
the end-effector is provided with a geometrical pattern providing the reference points, wherein the end-effector comprises a cooperative target having a triangular shape and being provided with a triangular or chess-board-like geometrical pattern and/or with markers for orientating and positioning the cooperative target.

15. The coordinate measuring machine as claimed in claim 6, wherein:
the coordinate measuring machine comprises an LED array for illuminating the end-effector.

16. The coordinate measuring machine as claimed in claim 6, wherein:
the coordinate measuring machine comprises reference markers on the metrology table in a region where the possible target object is placed, enabling a calibration of positions of the imaging detectors against the reference markers.

17. The coordinate measuring machine as claimed in claim 6, wherein:
the coordinate measuring machine comprises a sensor unit comprising multiple sensors, wherein integration of signals from the multiple sensors of the sensor unit and of signals from the imaging detectors is performed using sensor fusion algorithms.

18. The coordinate measuring machine as claimed in claim 17, wherein:
the signals from the multiple sensors of the sensor unit includes high-frequency signals.

19. The coordinate measuring machine as claimed in claim 17, wherein:
the signals from the multiple sensors of the sensor unit includes low-frequency signals from absolute position measurements in six degrees of freedom.

20. The coordinate measuring machine as claimed in claim 17, wherein:
the sensor fusion algorithms includes a Kalman filter.

21. The coordinate measuring machine as claimed in claim 17, wherein:
the sensor unit is supported by the end-effector and the multiple sensors being dedicated for relative position determinations and/or displacement determinations.

22. The coordinate measuring machine as claimed in claim 17, wherein:
the sensor unit is embodied as multi axis acceleration sensors and/or an inertial measurement unit IMU and/or gyros and/or magnetometers.

23. The coordinate measuring machine as claimed in claim 17, wherein:
the sensor unit enables signal acquisition at a high frequency.

24. The coordinate measuring machine as claimed in claim 6, wherein:
a driving system of the carrier comprises a motor axis and a driving axis, a reduction between the motor axis and the driving axis being provided.

25. The coordinate measuring machine as claimed in claim 6, wherein:
a driving system of the carrier comprises a motor axis and a driving axis, a reduction between the motor axis and the driving axis being provided, by means of a cable reduction.

* * * * *